Figure 1:
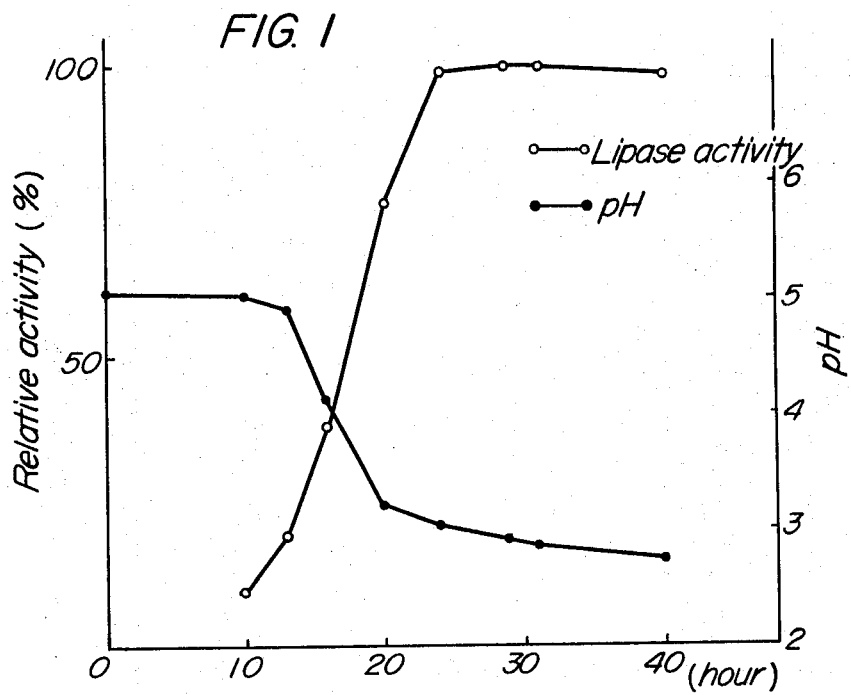

United States Patent

[11] 3,619,372

| [72] | Inventors | Fumihiko Yoshida;<br>Hiroshi Motai; Eiji Ichishima, all of Noda-shi, Japan |
|---|---|---|
| [21] | Appl. No. | 560,709 |
| [22] | Filed | June 27, 1966 |
| [45] | Patented | Nov. 9, 1971 |
| [73] | Assignee | Kikkoman Shoyer Co., Ltd.<br>Noda-shi, Japan |

[54] ACID RESISTANT LIPASE AND PROCESS FOR PREPARATION THEREOF
9 Claims, 6 Drawing Figs.

| [52] | U.S. Cl. | 195/66 R,<br>195/62 |
|---|---|---|
| [51] | Int. Cl. | C12d 13/10 |
| [50] | Field of Search | 195/62, 66 |

[56] References Cited
UNITED STATES PATENTS

| 2,676,906 | 4/1954 | Rose et al. | 195/66 |
|---|---|---|---|
| 3,189,529 | 6/1965 | Yamada et al. | 195/62 |
| 3,262,863 | 7/1966 | Fukumoto et al. | 195/66 |
| 3,368,903 | 2/1968 | Johnson et al. | 195/62 X |

*Primary Examiner*—Lionel M. Shapiro
*Attorney*—Wenderoth, Lind & Ponack

ABSTRACT: Lipase which is acid resistant and has an average molecular weight of 43,500 and comprises glutamic acid or glutamine, threonine, –S–S bonds, and mannose. The lipose is prepared by culturing *Torulopsis ernobii* ATCC 20000 in a liquid medium containing carbon, nitrogen and other inorganic salt source under an aerobic condition. Vegetable oils or fatty acids may be added to the medium.

ACID RESISTANT LIPASE AND PROCESS FOR PREPARATION THEREOF

The present invention relates to a process for preparing acid resistant lipase by culturing *Torulopsis ernobii* under aerobic condition. Lipase has been produced with the aid of *Candida lipolytica* by Peter et al. [J. Bact. 55,581 (1948)], *Candida paralipolytica* and *Candida cylindracese* by Yamada et al. [J. Arg. Chem. 36,858 (1962) & 37,649 (1963)] and *Candida fresenii*, *Torulopsis elegans* by Alford et al. [J. Lipid. Res. 5,390 (1964)] but the obtained lipase is not stable enough to acids.

The present inventors have found that highly acid resistant lipase and highly lipolytic activity can be obtained by culturing in liquid the strain ATCC No. 20000 belonging to Torulopsis under aerobic conditions.

The present strain is identified to be *T. ernobii* according to the method of Lodder et al. The microbiological properties thereof are shown in the following table.

TABLE 1

The morphological and physiological properties of *Torulopsis ernobii*.

Growth in malt extract:
　After 3 days at 25° C. cells are round to oval (0.5–4)× (1–4) single, in pairs. A sediment is formed. After 1 month at 17° C. only a sediment is formed.

Streak culture on malt agar:
　After 1 month at 17° C. the streak culture is pale yellow, glistening, smooth, with a smooth margin.

Slide culture:
　No pseudomycelium is formed.

Sporulation: Not observed.

Fermentation: Only glucose is fermented.

Sugar assimilation: Glucose+ Maltose+ Lactose− Galactose+ Saccharose+

Assimilation of potassium nitrate: Negative

Ethanol as sole source of carbon: Slight growth

Growth in milk: No coagulation

Splitting of esculin: Negative

The above-mentioned lipase is obtained by performing the culture, for example, in 15 l. of the culture medium (pH 5.05) which consists of 1.5 percent of defatted soybean, 1 percent of wheat flour, 0.5 percent of $K_2HPO_4$, 0.2 percent of $(NH_4)_2SO_4$, 0.2 percent of olive oil and the remainder water at a temperature of 30° C. for 20 to 30 hours under the condition of agitation of 500 r.p.m. and aeration of 15 l./min. in a 30 l.-jar fermenter.

The percentage in the present specification is, unless otherwise specified, shown by weight per volume.

FIG. 1 shows culturing time, pH and lipase activity. As will be seen in FIG. 1, the present strain produces acid, the lipase is produced accompanied by decrease of the pH value. The thus obtained enzyme solution is purified by 50 percent of saturated ammonium sulfate fractionation, batch method of DEAE (diethylaminoethylene)-cellulose, DEAE-cellulose column chromatography (Brown Co. U.S.A.) and gel filtration of Sephadex G-100 (Pharmacea Co. Sweden). The specific activity and yield of the substance obtained by the foregoing purification are shown in table 2.

TABLE 2.—PURIFICATION OF LIPASE

| | Specific activity | Recovery, percent |
|---|---|---|
| Filtrate of culture broth | 6.5 | 100.0 |
| ↓ | | |
| $(NH_4)_2SO_4$ ppt. at pH 4.5 (60% satd.) | 60.0 | 70.5 |
| ↓ Dialyzed (pH 5.9). | | |
| DEAE-cellulose Bed (pH 5.9) | | |
| ↓ Washed with 0.1M NaCl. | | |
| ↓ Extracted with 0.2M NaCl. | | |
| Extract | 656.0 | 49.9 |
| ↓ | | |
| DEAE-cellulose chromatography (pH 5.9) | 751.1 | 40.4 |
| ↓ Dialyzed (pH 5.9). | | |
| DEAE-cellulose rechromatography (pH 5.9) | 1,148.0 | 33.2 |
| ↓ Dialyzed (pH 4.9) lyophilized. | | |
| Sephadex G-100 gel filtration (pH 4.9) | 1,500.3 | 31.5 |
| ↓ Lyophilized. | | |
| Purified lipase | | |

The purified preparation is homogeneous by such criteria as sedimentation in the ultracentrifuge and free electrophoresis.

In this case, the lipase activity was measured according to the method by Yamada et al. (J. Agr. Chem. 36, 360 (1962)), that is, free fatty acid was titrated, till pH 11, with 0.05N NaOH by use of an autotitrator and the amount of enzyme which liberates acid of a microequivalent per minute was regarded as one unit.

Various properties of the purified enzyme are described in the following.

Figure 2:
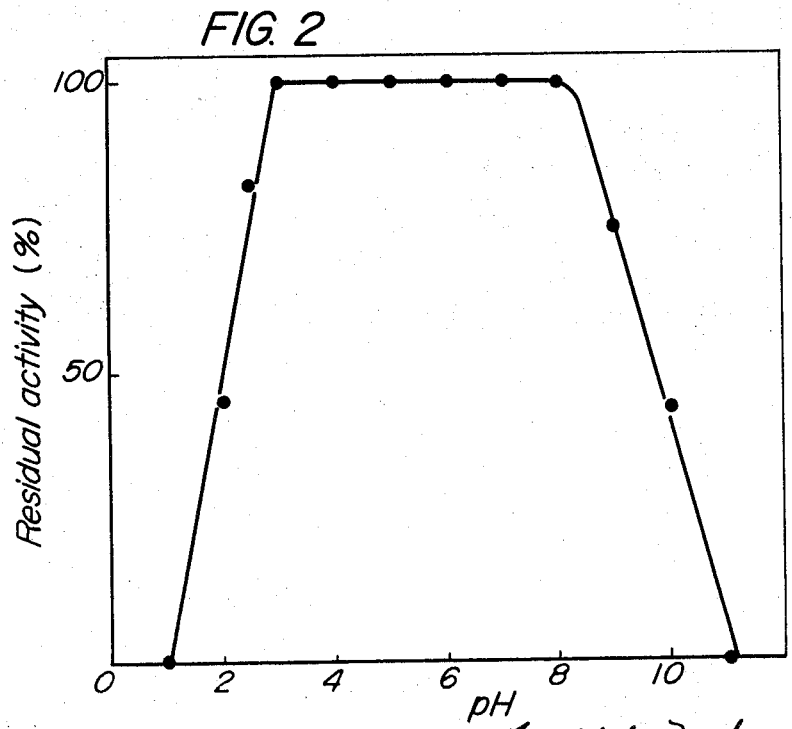

FIG. 2 shows pH-stability of the lipase after incubation of the enzyme solution for 60 min. at 37° C.

With various pH values of Sorensen's buffer (pH 1.5 to 2), McIlvaine's buffer (pH 3 to 8), $NH_4OH$–$NH_4Cl$ buffer (pH 9 to 11), the residual activities were assayed.

The inactivation of lipase is not recognized at pH 3.0 at a temperature of 37° C. after 60 min. and the lipase is extremely stable.

In the aforementioned treatment condition, the inactivation of lipase does not occur till pH 3 to 8.

Figure 3:
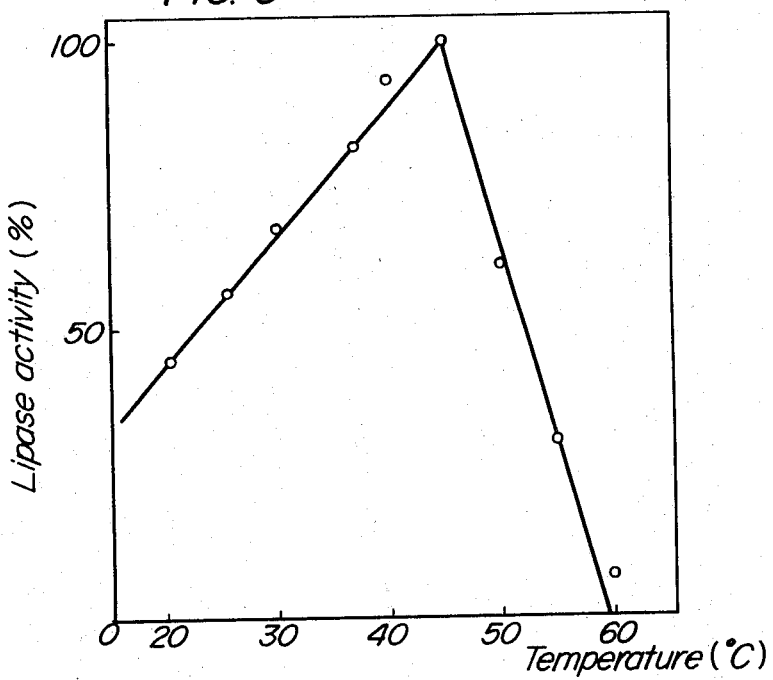

FIG. 3 shows the effect of temperature on the lipase activity. The reaction mixture used for the experiment shown in FIG. 3 contained 0.5 ml. of enzyme solution, 2.5 ml. of 25 percent (V/V) olive oil emulsion and 20 ml. of McIlvaine's buffer (pH 6.5). These were incubated for 25 min. at the indicated temperature.

Figure 4:
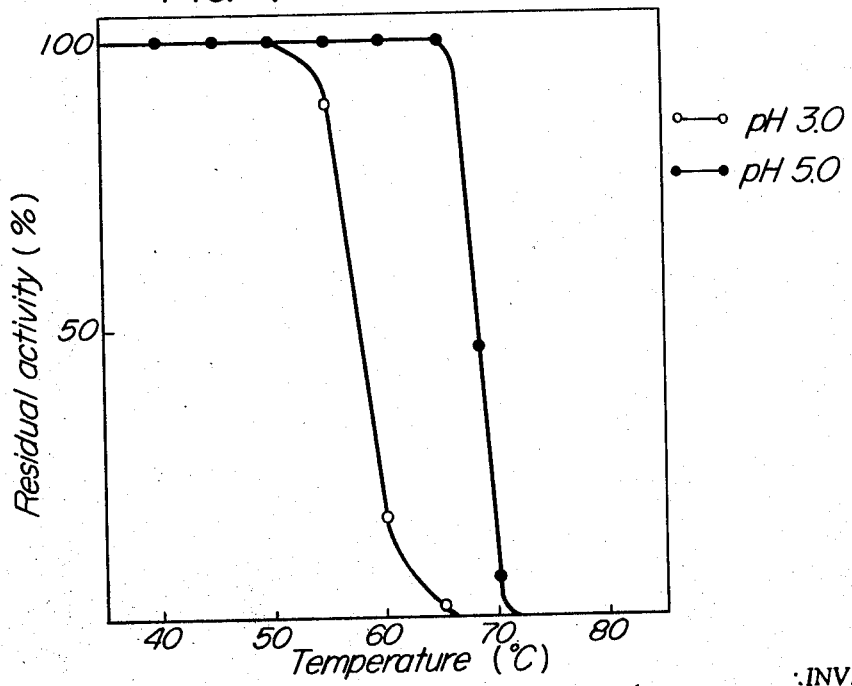

As shown in FIG. 3, the optimum temperature is 45° C. The thermal stability of the lipase is shown in FIG. 4. In the experiments shown in FIG. 4, 0.5 ml. of enzyme solution in McIlvaine's buffer (pH 3.0 and pH 5.0) was heated at the indicated temperature for 10 min. in a water bath and immediately cooled. As shown in FIG. 4, the thermal stability of the lipase is extremely high and the inactivation is not recognized even at pH 3.0 at a temperature of 50° C. after 10 min. Further it does not occur till a temperature of 65° C. at pH 5.0.

Figure 5:
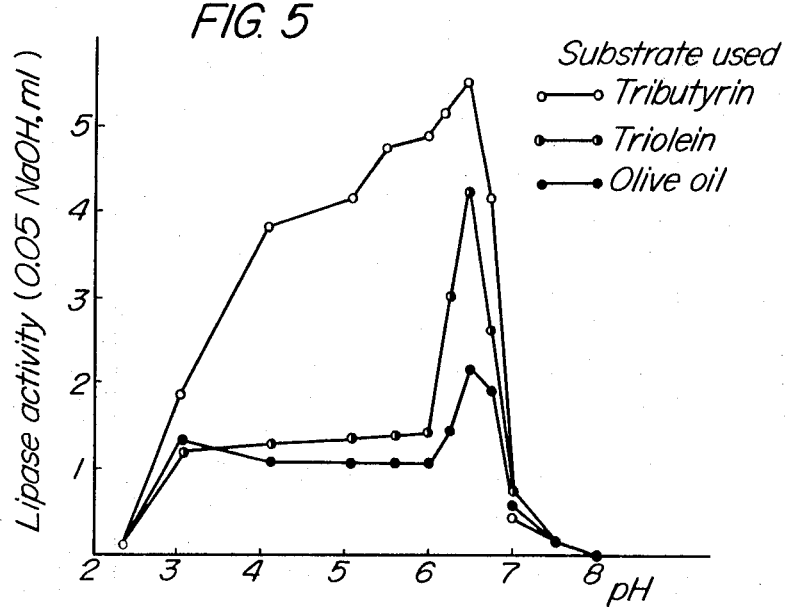

FIG. 5 shows the effect of pH on the lipase activity. In the experiment shown in FIG. 5, the reaction mixture contained 2.0 ml. of buffer, 2.5 ml. of emulsion, 0.5 ml. of enzyme solution, and these were incubated at 37° C. for 25 min., McIlvaine's buffer (pH 2.2 to 8) was used and tributyrin, triolein and olive oil were used as substrates. The optimal pH is 6.5, as clarified in FIG. 5, when olive oil, tributyrin and triolein are used as substrates, and the hydrolysis is sufficiently conducted on an acid side.

The effect for the various inhibitors is shown in table 3.

TABLE 3.—EFFECT OF VARIOUS REAGENTS ON LIPASE ACTIVITY

| Reagent | Concentration (M) | pH | Temp, (° C.) | Time, min. | Residual activity, percent |
|---|---|---|---|---|---|
| None | | | | | 100 |
| L-cysteine | 5×10⁻³ | 4.9 | 18 | 30 | 100 |
| Glutathione (reduced) | 5×10⁻³ | 5.2 | 18 | 30 | 89 |
| o-Phenanthroline | 5×10⁻³ | 5.3 | 18 | 30 | 100 |
| 8-hydroxyquinoline | 5×10⁻³ | 5.3 | 18 | 30 | 92 |
| Sodium pyrophosphate | 5×10⁻³ | 5.4 | 18 | 30 | 100 |
| EDTA | 5×10⁻³ | 5.2 | 18 | 30 | 98 |
| PCMB | 10⁻³ | 6.7 | 18 | 30 | 94 |
| Phenylisothiocyanate | 5×10⁻³ | 5.1 | 18 | 30 | 98 |
| Acetonitrile | 10⁻¹ | 5.1 | 18 | 30 | 100 |
| Diazobenzene sulfonic acid | 2×10⁻¹ | 7.0 | 18 | 30 | 0 |
| Tosyl chloride | 10⁻³ | 5.8 | 18 | 30 | 100 |
| Pipsyl chloride | 10⁻³ | 5.8 | 18 | 30 | 100 |
| NBS | 5×10⁻³ | 5.2 | 18 | 30 | 0 |
| Sodium laurylsulfate | 5×10⁻³ | 5.3 | 18 | 30 | 0 |
| Cyanogen bromide | 5×10⁻³ | 5.2 | 18 | 30 | 0 |
| Propylene oxide | (¹) | 4.0 | 20 | (²) | 100 |
| Nitrous acid | | 4.0 | 0 | 60 | 100 |
| Iodine | 5×10⁻³ | 5.1 | 18 | 30 | 0 |
| Photooxidation | | 7.0 | 13 | 120 | 46 |
| With MB | | 7.0 | 13 | 120 | 70 |
| With Riboflavin | | 7.0 | 13 | 120 | 0 |

¹ 10 percent.
² 1 day.

As clarified in the above-described table, the lipase activity is not inhibited by chelating agents. Moreover the specificity of substrate to triglycerides is shown in table 4. Tributyrin is extremely well hydrolyzed.

TABLE 4

Action of Lipase on Various Triglycerides

| Triglycerides | Rate of hydrolysis (%) |
|---|---|
| Triacetin | 0 |
| Tributyrin | 270.4 |
| Trilaurin | 0 |
| Tripalmitin | 35.1 |
| Tristearin | 77.6 |
| Triolein | 100.0 |

Reaction mixture contained 0.5 ml. of an enzyme solution, 2.5 ml. of substrate emulsion and 20 ml. of Temple's buffer (pH 6.5). These were incubated at 37° C. for 25 min. and were shaken at 80 strokes per min. in a Monod type shaker.

Figure 6:
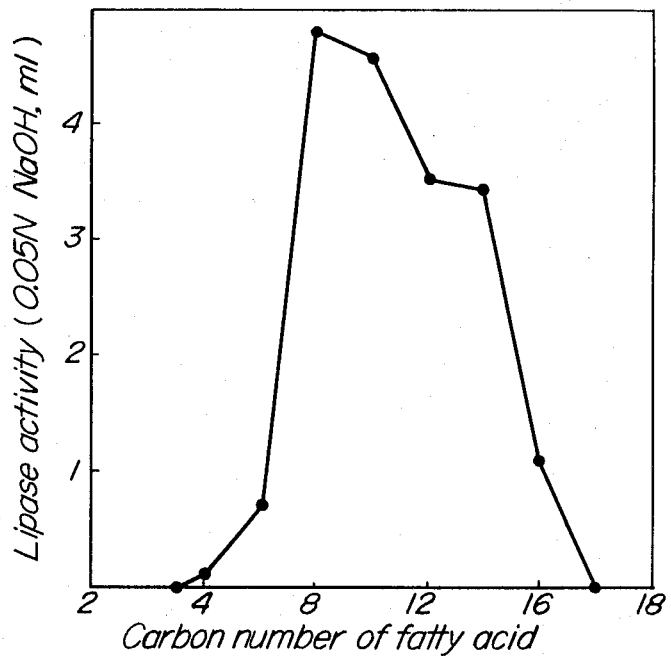

FIG. 6 shows the action of the lipase on saturated methyl esters. The test shown in FIG. 6 was carried out using a reaction mixture containing 5 ml. of Temple's buffer (pH 6.5), 3 ml. of water, 1 ml. of substrate and 1 ml. of an enzyme solution (0.0025 percent). These mixtures were incubated at 37° C. and were shaken for 50 min. at 80 strokes per minute in a Monod type shaker.

The fatty acid having $C_8$ is extremely well hydrolyzed in methyl esters of fatty acids. (FIG. 6)

The thus obtained purified enzyme is glycoprotein having the average molecular weight of 43,500, one mole of glutamic acid or glutamine as N-terminal amino acid, one mole of threonine as C-terminal amino acid, three S–S–bonds (disulfite bond) and 14 to 15 percent of mannose. The amino acid composition of this protein is shown in table 5.

TABLE 5

Amino Acid Composition of the Lipase

Residues per molecule (M=43500)

| Amino acid | Time of hydrolysis | | | Average or extrapolated value |
|---|---|---|---|---|
| | 24 hrs. | 48 hrs. | 72 hrs. | |
| Lys. | 11.9 | 12.9 | 12.7 | 13 |
| His. | 6.7 | 7.8 | 7.3 | 7 |
| Arg. | 3.7 | 3.1 | 3.7 | 4 |
| Asp. | 38.8 | 39.5 | 37.1 | 39 |
| thr. | 22.1 | 21.7 | 19.3 | 22 |
| Ser. | 18.6 | 16.7 | 14.0 | 20 |
| Glu. | 20.4 | 21.0 | 19.3 | 20 |
| Pro. | 10.9 | 11.0 | 10.9 | 11 |
| Gly. | 21.7 | 22.3 | 20.9 | 22 |
| Ala. | 25.6 | 26.5 | 24.8 | 26 |
| Cys. | 3.0 | 3.0 | 2.6 | 3 |
| Val. | 25.1 | 28.8 | 27.5 | 28 |
| Met. | 1.8 | 1.8 | 1.7 | 2 |
| Ileu. | 19.6 | 21.8 | 21.1 | 22 |
| Leu. | 21.8 | 22.3 | 21.3 | 22 |
| Tyr. | 20.5 | 20.0 | 18.1 | 21 |
| Phr. | 22.1 | 22.0 | 20.9 | 22 |
| Try. | 2.3 | | | 2 |
| Amido-N | 34.0 | | | 34 |
| Mannose | | | | 37 |
| Total | | | | 377 |

The acid stable lipase as described above is used for various purposes such as in digestion, in the field of the food industry, and so on.

The culture method and the preparing process of the lipase by use of the present micro-organism are explained in the following. Either synthesized culture medium or natural culture medium containing carbon sources organic nitrogen sources, inorganic nitrogen and vitamins in appropriate amounts may be used as the culture composition. In this case the addition of oil or fatty acids accelerates the production of lipase.

TABLE 6

Effect of Concentration of Oil

| No addition | | 100 |
|---|---|---|
| Olive oil | 0.2% | 240 |
| | 0.4% | 240 |
| | 0.6% | 225 |
| | 0.8% | 160 |

TABLE 7

Effect of various kinds of oil (0.2%)

| No addition | 100 |
|---|---|
| Olive oil | 226 |
| Perilla oil | 212 |
| Cottonseed oil | 192 |
| Rice bran oil | 237 |
| Rapeseed oil | 229 |
| Sesame oil | 217 |
| Soybean oil | 201 |
| Peanut oil | 191 |
| Linseed oil | 234 |

TABLE 8

Effect of Fatty Acid acids (0.1%

| No addition | 100 |
|---|---|
| Lauric acid | 35.2 |
| Oleic acid | 129.3 |
| Palmitic acid | 122.0 |
| n-Caprylic acid | 71.5 |
| n-Capric acid | 37.2 |
| n-Caproic acid | 112.5 |
| n-Butyric acid | 158.9 |
| Myristic acid | 120.4 |
| Eraigic acid | 116.4 |
| Stearic acid | 128.0 |
| Linolic acid | 155.6 |
| Linoleic acid | 141.3 |

The liquid culture is more effective than the solid culture for the production of lipase. The culture is performed at a temperature of 20° to 37° C. at pH 3.0 to 6.8 for 20 to 30 hours.

As an example of the culture medium for the production of lipase, the culture medium consisting of 1 percent of wheat flour, 1.5 percent of defatted soybean, 0.5 percent of dry yeast, 0.5 percent of $K_2HPO_4$, 0.2 percent of ammonium sulfate, 0.2 percent of olive oil and 0.1 percent of Pronon 0201 (anion defoaming agent, Nihon Fat & Oil Co.) is used and the aerobically stirring culture is carried out. In this case, wheat flour is used within the limit of 0.5 to 4 percent and further 0.1 to 1 percent of dry yeast and 0.1 to 1 percent of $K_2HPO_4$ are also used. $KH_2PO_4$ is usable instead of $K_2HPO_4$.

As an example of inorganic nitrogen sources, ammonium sulfate may be used within the limit of 0.1 to 0.5 percent. Moreover $NH_4Cl$, $NH_4NO_3$, $NH_4CO_3$, and $NH_4H_2PO_4$ are usable. Oil and fatty acids can be employed within the limit of 0.05 to 0.6 percent.

The lipase preparation of higher activity is obtained by treating the enzyme solution using the solvent-precipitation method, salting-out method, adsorption method, concentration method and so on.

Acetone, ethanol, methanol and isopropanol are employed as solvents in the solvent-precipitation method. The part of the said solution which precipitates by adding the solvents to give a concentration of 20 to 55 percent at pH 3.5 to 7 is recovered.

In the salting-out method, ammonium sulfate and ammonium nitrate are used. When ammonium sulfate is employed, a part of the solution which precipitates by the addition of ammonium sulfate to give a concentration of more than 30 percent saturated is recovered.

The thus obtained lipase preparation can be preserved for a long time when kept in a state of dryness.

EXAMPLE 1

*Torulopsis ernobii* ATCC No. 20000 was inoculated in 15 l. of the culture liquor containing 1.5 percent of defatted soy bean flour, 1 percent of wheat flour, 0.5 percent of dry yeast, 0.5 percent of $K_2HPO_4$, 0.2 percent of ammonium sulfate, 0.1 percent of Pronon 0201, 0.2 percent of olive oil and water in a 30 l. jar fermenter and was cultured at pH 5.2 at 33° C. under the conditions of the aeration amount of 15 l./min. and the stirring of 500 r.p.m. for 24 hours. The lipase activity in the culture liquor was 110 units per milliliter. 15 l. of the thus obtained culture filtrate were adjusted to pH 6.0 and cooled at 5° C. Then the cold ethanol was gradually added to give a concentration of 40 percent and the precipitate was filtered by centrifugal separation and dried. Consequently 82.5 g. of the raw enzyme was obtained.

Recovery thereof was 65 percent.

EXAMPLE 2

*Torulopsis ernobii* ATCC No. 20000 was inoculated in the culture medium (15 l.) prepared by adding 0.2 percent of rice bran oil to the culture medium containing 1.5 percent of defatted soy bean flour, 1 of wheat flour, 0.5 percent of dry yeast, 0.5 percent of $K_2HPO_4$, 0.2 percent ammonium sulfate 0.1 percent of Pronon 0201 and water in 30 ml. jar fermenter under the same aerobic conditions as in example 1. The lipase activity was 115 units/ml. 15 l. of the thus obtained culture filtrate was adjusted to pH 4.7 and cooled to 5° C. Thereto, ammonium sulfate was gradually added to give a concentration of 50 percent saturated. The precipitate was filtered by centrifugal separator and dried. 17.25 g. of the enzyme preparation were obtained. Recovery thereof was 70 percent.

What we claim is:

1. Process for preparing lipase which comprises culturing *Torulopsis ernobii* ATCC No. 20000 in a liquid culture medium containing sources of carbon, nitrogen and necessary inorganic salts and recovering the lipase produced.

2. Process according to claim 1, wherein the culture is performed under an aerobic condition.

3. Process according to claim 1, wherein the culture is conducted under an aerobic condition and in the presence of defoaming agents.

4. Process according to claim 1, wherein the culture is conducted at pH 3 to 6 at a temperature of 20° to 37° C.

5. Process according to claim 1, wherein the culture medium contains vegetable oil or fatty acid.

6. Process according to claim 5, wherein the culture is conducted under an aerobic condition at pH 3 to 6 at a temperature of 20° to 37° C.

7. Process according to claim 5, wherein the culture is conducted under an aerobic condition and in the presence of a defoaming agent at pH 3 to 6 at a temperature of 20° to 37° C.

8. Process according to claim 5, wherein the vegetable oil is a member selected from the group consisting of olive oil, perilla oil, cottonseed oil, rice bran oil, rapeseed oil, sesame oil, soy bean oil, peanut oil and linseed oil or the mixture thereof.

9. Process according to claim 5, wherein the fatty acid is a member selected from the group consisting of oleic acid, palmitic acid, n-caproic acid, n-butyric acid, myristic acid, eraigic acid, stearic acid, linolic acid and linoleic acid or the mixture thereof.

* * * * *

UNITED STATES PATENT OFFICE
CERTIFICATE OF CORRECTION

Patent No. 3,619,372         Dated November 9, 1971

Inventor(s) Fumihiko YOSHIDA, Hiroshi MOTAI and Eiji ICHISHIMA

It is certified that error appears in the above-identified patent and that said Letters Patent are hereby corrected as shown below:

Page 1 of the Patent, 7th line, 1st column, after "[73] Assignee", please change "Kikkoman Shoyer Co., Ltd." to -- Kikkoman Shoyu Co., Ltd. --.

Signed and sealed this 15th day of August 1972.

(SEAL)
Attest:

EDWARD M. FLETCHER, JR.            ROBERT GOTTSCHALK
Attesting Officer                  Commissioner of Patents